United States Patent [19]

Hori et al.

[11] Patent Number: 5,109,432
[45] Date of Patent: Apr. 28, 1992

[54] CHARACTER RECOGNITION METHOD

[76] Inventors: Hitoshi Hori, Mizusawa; Akihiro Endo, Waga; Kuninori Takahashi, Hienuki; Juro Inomata, Mizusawa, all of Japan

[73] Assignees: Fujitsu Ltd., Kawasaki, Fujitsu Tohoku Electronics, Aizuwakamatsu, Honda Electron Co., Ltd., Tokyo, all of Japan

[21] Appl. No.: 457,608

[22] Filed: Dec. 27, 1989

[51] Int. Cl.⁵ .............................................. G06K 9/62
[52] U.S. Cl. ...................................... 382/30; 382/25; 382/33
[58] Field of Search ................. 382/30, 33, 32, 26, 382/10, 16, 18, 25

[56] References Cited

U.S. PATENT DOCUMENTS

| | | | |
|---|---|---|---|
| 2,894,247 | 7/1959 | Relis | 382/30 |
| 3,588,821 | 6/1971 | Charles . | |
| 3,878,509 | 4/1975 | Kikuchi . | |
| 4,027,284 | 5/1977 | Hoshino et al. | 382/30 |
| 4,110,737 | 8/1978 | Fuhey | 382/30 |
| 4,581,760 | 4/1986 | Schiller et al. | 382/38 |
| 4,628,533 | 12/1986 | Hongo et al. | 382/30 |
| 4,630,308 | 12/1986 | Hongo | 382/34 |
| 4,817,171 | 3/1984 | Stentiford | 382/30 |
| 4,872,024 | 10/1989 | Nagai et al. | 382/34 |
| 4,872,203 | 10/1989 | Asai et al. | 382/30 |

*Primary Examiner*—Joseph Mancuso
*Attorney, Agent, or Firm*—Armstrong, Nikaido, Marmelstein, Kubovcik & Murray

[57] ABSTRACT

A character recognition method includes steps of comparing input image data with character patterns of a predetermined dictionary and recognizing a character indicated by the input image data without requiring any special hardware in a conventional character recognition apparatus. Namely, the input image data is processed by using an unwanted-dot elimination mask and processed by using a positive mask and negative mask of each of the character patterns in the dictionary, and then a discrepancy ratio of each of the character patterns is calculated. Consequently, highly accurate character recognition can be carried out at a low cost without using special hardware, by decreasing the negative influence of a flaw, a missing portion, dust, and the like.

22 Claims, 9 Drawing Sheets

Fig. 4A
NUMERALS

24 DOTS

Fig. 4B
ROMAN LETTERS

11 DOTS

Fig. 4C
MARKS

26 DOTS

Fig. 4D
ALL CHARACTERS
(NUMERALS, ROMAN LETTERS, AND MARKS)

1 DOT

DISCREPANCY RATIO

| 0 | 0.667 |
|---|---|
| 1 | 0.900 |
| 2 | 0.659 |
| 3 | 0.404 |
| 4 | 0.847 |
| 5 | 0.786 |
| 6 | 0.710 |
| 7 | 0.721 |
| 8 | 0.587 |
| 9 | 0.710 |

Fig. 8A
POSITIVE MASK

Fig. 8B
NEGATIVE MASK

CHARACTER RECOGNITION METHOD

BACKGROUND OF THE INVENTION

1. Field of the Invention

The present invention relates to a character recognition method, in particular, to a character recognition method of comparing input image data with characters in a predetermined dictionary and recognizing a character indicated by the input image data.

2. Description of the Related Art

Recently, OCR (Optical Character Reader) devices, which optically read a pattern such as a character, a mark and the like, are used in various arts. For example, in a semiconductor device manufacturing process, numerals, letters, marks and the like, which are printed on a semiconductor wafer, are optically read by the OCR device, and the characters printed on the wafer are recognized from the image data read by the OCR device. Consequently, for example, a preferable condition of a specific process in the manufacturing process of the semiconductor device is established and management of the wafer which may be reprocessed is carried out by using the recognized characters. In the above description, an image of the characters printed on the semiconductor wafer may be taken by a camera, and the image data may then be changed into a binary code by a binary processing circuit. Furthermore, the digital image data of the binary code may be changed into a dot-matrix form by a dot-matrix processing circuit, after which a character recognition process can be carried out.

In a conventional character recognition method, input image data in a dot-matrix form is compared with a predetermined dictionary (for example, compared by using a pattern matching method), that is, the dot-matrix data of the image data is successively compared with dot-matrix data of each of the character patterns which are previously provided as reference characters in the dictionary. Consequently, a character, having the smallest number and lower than a predetermined number (which is a threshold value) of different dots between dot-matrix data of each of character patterns and the dot-matrix data of the image data, is recognized as the character indicated by the input image data.

Note, in the manufacturing process of semiconductor devices, for example, a semiconductor wafer is frequently nipped and removed by using a pincette and the like, so that the characters printed on the wafer may be damaged by the pincette and the like, and a flaw may be formed on the characters on the wafer.

Additionally, dust may adhere to the surface of the wafer where the characters are printed, so that a part of the characters of the wafer are not visible. As described above, when the characters on the wafer are obscured by a flaw, a missing portion, dust and the like, the characters printed on the wafer may not be correctly recognized from the input image data.

In consideration of the above, a conventional character recognition method is proposed, wherein complicated image processes are carried out in the steps of taking an image of characters by a camera, changing an analog signal of the image data into a binary code by a binary processing circuit, and changing the digital image data of the binary code into a dot-matrix form by a dot-matrix processing circuit, in order to decrease the negative influences due to a flaw and the like, and increasing the accurcy of the character recognition. In the above conventional character recognition method, a plurality of special hardware is required to decrease the negative influence of the flaw and the like. Consequently, though a highly accurate character recognition can be possible, the cost for the character recognition would be very expensive.

SUMMARY OF THE INVENTION

It is an object of the present invention to provide a character recognition method having a highly accurate character recognition method at a low cost without using special hardware, by decreasing the negative influence of a flaw, a missing portion, dust, and the like.

According to the present invention, there is provided a character recognition method of comparing input image data with character patterns of a predetermined dictionary and recognizing a character indicated by the input image data, wherein the character recognition method comprises, an unwanted-dot elimination step of comparing the input image data with an unwanted-dot elimination mask constituted by unwanted dots not included in any character patterns in the dictionary, and eliminating the unwanted dots from the input image data, a missing-dot ratio calculation step having comparing image data of unwanted dots eliminated by the unwanted-dot elimination step with each positive mask indicating positive portions of each of the character patterns in the dictionary, and calculating a missing-dot ratio of the image data to each of the positive masks of the character patterns, an excess-dot ratio calculation step of comparing the image data having unwanted dots eliminated by the unwanted-dot elimination step with each negative mask indicating negative portions of each of the character patterns in the dictionary, and calculating an excess-dot ratio of the image data to each of the negative masks of the character patterns, and a discrepancy ratio calculation step of calculating a discrepancy ratio of the image data to each of the character patterns in the dictionary by using the calculated missing-dot ratio and excess-dot ratio.

The input image data may be produced by steps of taking an image of characters by a camera, changing an analog signal of the taken image data into a binary code by a binary processing circuit, and changing the digital image data of the binary code into a dot-matrix form by a dot-matrix processing circuit.

Further, according to the present invention, there is provided a character recognition apparatus for comparing input image data with character patterns of a predetermined dictionary and recognizing a character indicated by the input image data, wherein the character recognition apparatus comprises, an unwanted-dot elimination unit for comparing the input image data with an unwanted-dot elimination mask constituted by unwanted dots not included in any character patterns in the dictionary, and eliminating the unwanted dots from the input image data, a missing-dot ratio calculation unit for comparing image data having unwanted dots eliminated by the unwanted-dot elimination unit with each positive mask indicating positive portions of each of the character patterns in the dictionary, and calculating a missing-dot ratio of the image data to each of the positive masks of the character patterns, an excess-dot ratio calculation unit for comparing the image data having unwanted dots eliminated by the unwanted-dot elimination unit with each negative mask indicating negative portions of each of the character patterns in the dictionary, and calculating an excess-dot ratio of the image data to each of the negative masks of the character patterns, and a discrepancy ratio calculation unit for calculating a discrepancy ratio of the image data to each of the character patterns in the dictionary by using the calculated missing-dot ratio and excess-dot ratio.

The character recognition apparatus may further comprise, a camera for taking an image of characters, a binary processing circuit, connected to the camera, for changing an analog signal of the taken image data into a binary code, and a dot-matrix processing circuit, connected to the binary processing circuit, for changing the digital image data of the binary code into a dot-matrix form.

The unwanted-dot elimination mask, the positive masks and negative masks of the character patterns may be in the same dot-matrix form as the input image data.

The input image data, the unwanted-dot elimination mask, the positive masks and the negative masks of said character patterns may be in a 9×13 dot-matrix form.

The unwanted-dot elimination mask may be in a dot-matrix form including character patterns of all numerals from "0" to "9", and the positive and negative masks may be in a dot-matrix form of each of the numerals from "0" to "9". The unwanted-dot elimination mask may be in a dot-matrix form including character patterns of all roman letters from "A" to "Z", and the positive and negative masks may be constituted by a dot-matrix form of each of the roman letters from "A" to "Z". The unwanted-dot elimination mask may be in a dot-matrix form including character patterns of six marks "#", "$", "%", "&", "-" and "/", and the positive and negative masks may be in a dot-matrix form of each of the marks "#", "$", "%", "&", "-" and "/".

The missing-dot ratio to a specific character pattern in the dictionary may be calculated by a formula "missing-dot ratio=missing-dot number/all dot number of the specific character pattern". The excess-dot ratio to a specific character pattern in the dictionary may be calculated by a formula "excess-dot ratio=excess-dot number/(all dot number of the dot-matrix form−all dot number of the specific character pattern)". The discrepancy ratio of the image data to each of the character patterns in the dictionary may be calculated by a formula "discrepancy ratio=missing-dot ratio+excess-dot ratio", and a character pattern having the minimum value of the discrepancy ratio may be recognized as a character indicated by the input image data. The character recognition method or apparatus may be used for recognizing a character printed on a semiconductor wafer.

BRIEF DESCRIPTION OF THE DRAWINGS

The present invention will be more clearly understood from the description of the preferred embodiments as set forth below with reference to the accompanying drawings, wherein:

FIGS. 5, 5A, 5B are a flowchart indicating an example of a character recognition process of the character recognition method according to the present invention;

DESCRIPTION OF THE PREFERRED EMBODIMENTS

First, the principle of the character recognition method of the present invention will be explained.

Figure 1:
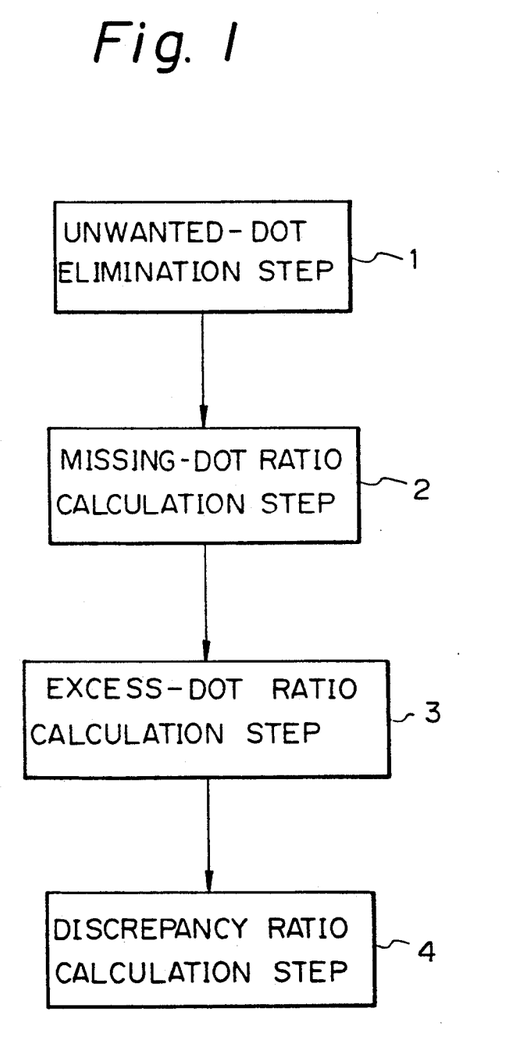
FIG. 1 is a flowchart indicating a principle of a character recognition method according to the present invention.

FIG. 1 is a flowchart indicating a principle of a character recognition method according to the present invention. According to the present invention, there is provided a character recognition method of comparing input image data with character patterns of a predetermined dictionary and recognizing a character indicated by the input image data, wherein the character recognition method comprises, an unwanted-dot elimination step 1 of comparing the input image data with an unwanted-dot elimination mask constituted by unwanted dots not included in any character patterns in the dictionary, and eliminating the unwanted dots from the input image data, a missing-dot ratio calculation step 2 having comparing image data of unwanted dots eliminated by the unwanted-dot elimination step with each positive mask indicating positive portions of each of the character patterns in the dictionary, and calculating a missing-dot ratio of the image data to each of the positive masks of the character patterns, an excess-dot ratio calculation step 3 of comparing the image data having unwanted dots eliminated by the unwanted-dot elimination step with each negative mask indicating negative portions of each of the character patterns in the dictionary, and calculating an excess-dot ratio of the image data to each of the negative masks of the character patterns, and a discrepancy ratio calculation step 4 of calculating a discrepancy ratio of the image data to each of the character patterns in the dictionary by using the calculated missing-dot ratio and excess-dot ratio.

As shown in FIG. 1, the character recognition method of the present invention comprises an unwanted-dot elimination step 1, a missing-dot ratio calculation step 2, an excess-dot ratio calculation step 3, and a discrepancy ratio calculation step 4. In the unwanted-dot elimination step 1, input image data is compared with an unwanted-dot elimination mask and unwanted dots are eliminated from the input image data. Note, the input image data is in a dot-matrix form, and the unwanted-dot elimination mask is constituted by unwanted dots which are not included in any character patterns in the dictionary. In the missing-dot ratio calculation step 2, image data having unwanted dots eliminated by the unwanted-dot elimination step 1 is compared with each positive mask, and a missing-dot ratio of the image data to each of the positive masks of the character patterns is calculated. Note, the positive mask indicates positive portions of each of the character patterns in the dictionary.

In the excess-dot ratio calculation step 3, the image data having unwanted dots eliminated by the unwanted-dot elimination step 1 is compared with each negative mask, and an excess-dot ratio of the image data to each of the negative masks of the character patterns is calculated. Note, the negative mask indicates negative portions of each of the character patterns in the dictionary. In the discrepancy ratio calculation step 4, a discrepancy ratio of the image data to each of the character patterns in the dictionary is calculated by using the calculated missing-dot ratio and excess-dot ratio. For example, in a discrepancy ratio calculation step 4, a discrepancy ratio of each of the character patterns in the dictionary is calculated by the sum of the calculated missing-dot ratio and the calculated excess-dot ratio, and a character pattern having the minimum discrepancy ratio is recognized as the character indicated by the input image data.

As described above, a character recognition method according to the present invention is applied at the step of processing input image data and recognizing a character indicated by the image data, and no special hardware is required in a conventional character recognition apparatus. Consequently, according to the present invention, a highly accurate character recognition can be realized at a low cost by decreasing the negative influence of a flaw, a missing portion, dust, and the like.

Below, the preferred embodiments of a character recognition method according to the present invention will be explained.

Figure 2:
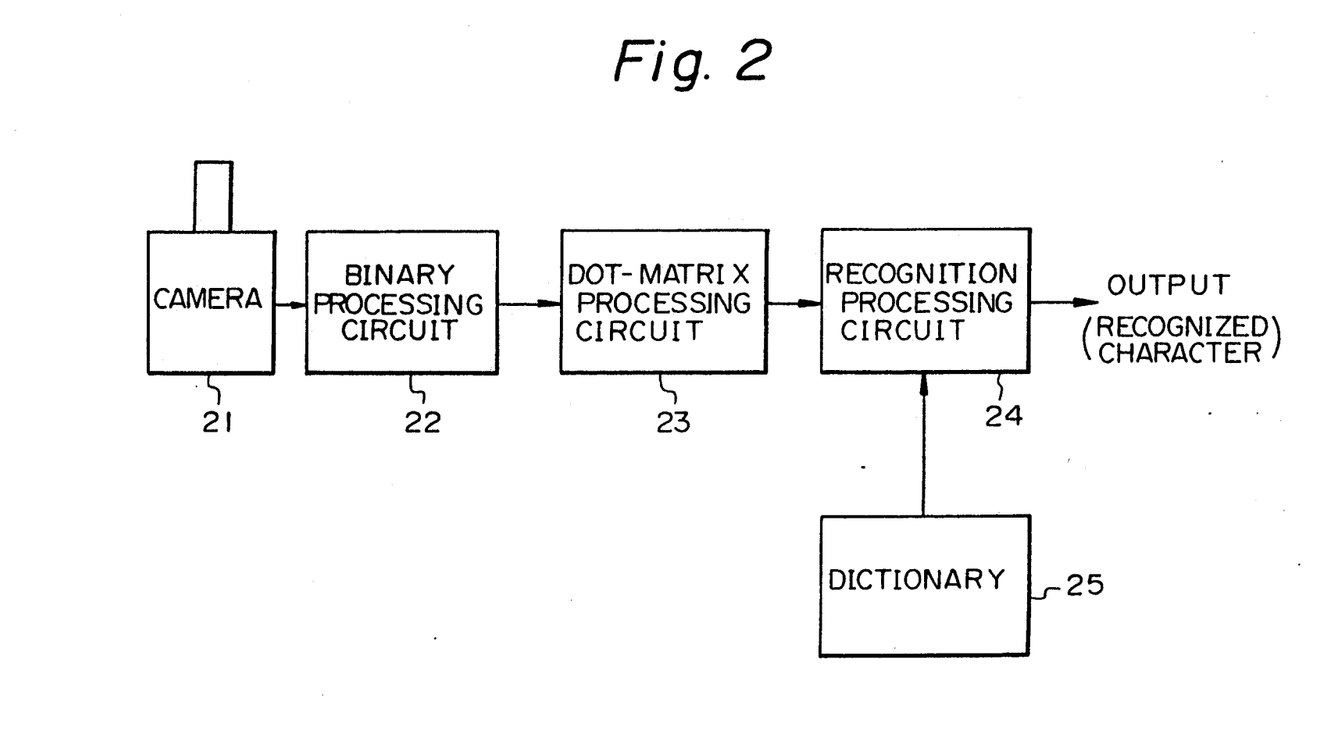
FIG. 2 is a block diagram roughly indicating an embodiment of a device applying the character recognition method of the present invention.

FIG. 2 is a block diagram roughly indicating an embodiment of a device applying the character recognition method of the present invention. As shown in FIG. 2, a character recognition apparatus applying the present invention comprises, for example, a camera 21, a binary processing circuit 22, a dot-matrix processing circuit 23, a recognition processing circuit 24, and a dictionary 25.

For example, the camera 21 takes an image or optically read patterns such as characters, marks and the like printed on a semiconductor wafer, and outputs electrical image data of the characters and the like changed from the optical image by photoelectric conversion. The output signal of the camera 21, which is an electrical image signal, is supplied to the binary processing circuit 22. The binary processing circuit 22 changes the input analog image signal to a binary code or digital signal and supplies it to the dot-matrix processing circuit 23. The dot-matrix processing circuit 23 changes the digital image data into a matrix form (for example, a 9×13 dot-matrix). Note, the process of changing to the matrix form in the dot-matrix processing circuit 23 is carried out by a dot-matrix configuration corresponding to that of character patterns in the dictionary. The image data, which is changed into the dot-matrix form of the specific dot-matrix configuration by the dot-matrix processing circuit 23, is supplied to the recognition processing circuit 24.

The input image data, which is read and changed in the manner described above, is processed in the recognition processing circuit 24 to recognize a character indicated by the image data, while decreasing the negative influence of a flaw, a missing portion, dust, and the like. Note, dot-matrix data (for example, a 9×13 dot-matrix) of character pattens in the dictionary 25, which is used for character recognition, is supplied from the dictionary 25, which is, for example, constituted by a read only memory device, to the recognition processing circuit 24. Furthermore, for example, the dot-matrix data of the character pattens supplied from the dictionary 25 to the recognition processing circuit 24 corresponds to the character patterns printed on the semiconductor wafer and the like. Namely, all character patterns printed on the semiconductor wafer and the like are previously provided in the character patterns of the dictionary 25.

In the above description, input of the image data can be carried out by using various processes and apparatuses according to the prior art. Furthermore, character recognition using the present invention is not limited only to characters printed on a semiconductor wafer.

Next, a character recognition process according to the present invention, which is carried out in the recognition processing circuit 24 by using the character patterns from the dictionary 25 in the above description, will be explained with reference to the drawings.

Figure 3A:
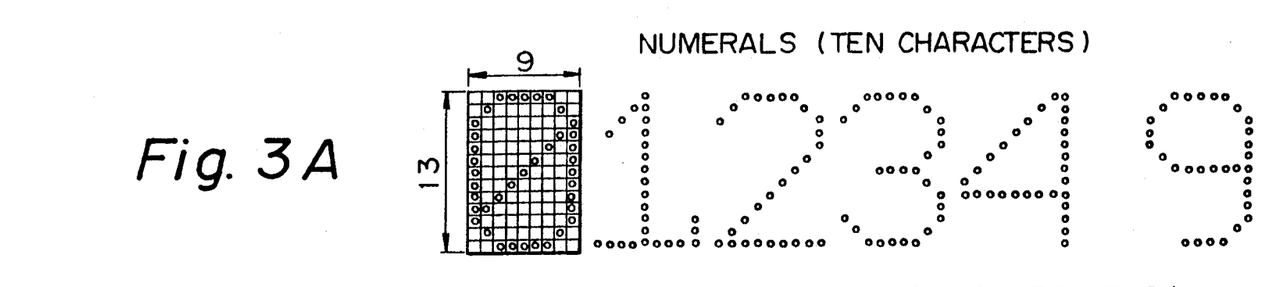
FIGS. 3A to 3C are diagrams indicating examples of character patterns used in the character recognition method of the present invention.
Figure 3B:
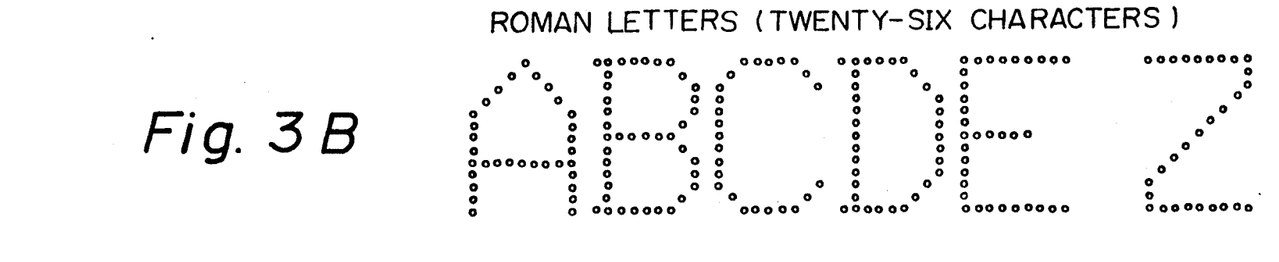
Figure 3C:
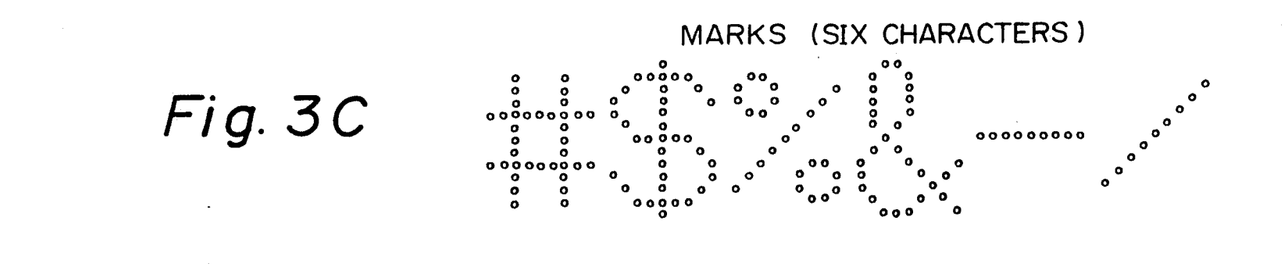

FIGS. 3A to 3C are diagrams indicating examples of character patterns used in the character recognition method of the present invention, and all of the character patterns are in a 9×13 dot-matrix form. FIG. 3A indicates ten characters comprising numerals from "0" to "9", FIG. 3B indicates twenty-six roman letters from "A" to "Z", and FIG. 3C indicates six characters comprising marks of "#", "$", "%", "&", "-", and "/". These character patterns are previously prepared in the dictionary 25, or previously stored in the memory device of the dictionary. The character patterns printed on the semiconductor wafer are, for example, the same patterns as those in the dictionary 25. Namely, all of the character patterns printed on the wafer are included in the dictionary.

For example, when character recognition is carried out by recognizing characters within the character patterns shown in FIGS. 3A to 3C, first, input image data is compared with an unwanted-dot elimination mask constituted by unwanted dots which are not included in any of the character patterns in the dictionary 25, and the unwanted dots are eliminated from the input image data. Note, as described above, the input image data is, for example, produced by steps of taking an image of characters by the camera 21, changing an analog signal of the taken image data into a binary code by the binary processing circuit 22, and changing the digital image data of the binary code into a dot-matrix form by the dot-matrix processing circuit 23.

Figure 4A:
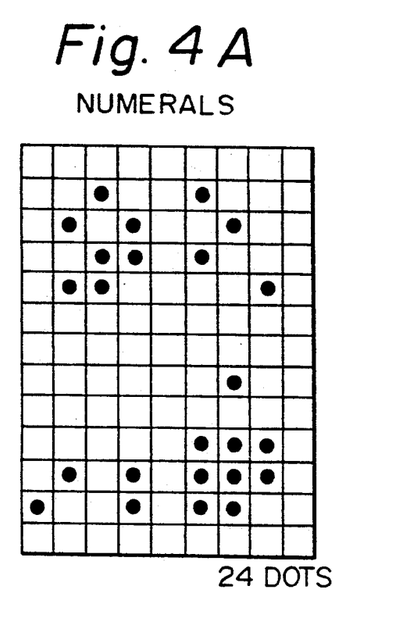
FIGS. 4A to 4D are diagrams indicating examples of unwanted-dot elimination masks of the character patterns shown in FIGS. 3A to 3C.

FIGS. 4A to 4D are diagrams indicating examples of unwanted-dot elimination masks of the character patterns shown in FIGS. 3A to 3C. FIG. 4A indicates an unwanted-dot elimination mask for a numeral constituted by dots which are not included in any character patterns of the numerals from "0" to "9". For example, all character patterns of the numerals from "0" to "9" and the unwanted-dot elimination mask for the numeral are in a 9×13 dot-matrix form, in this case, twenty-four dots are not included in any character patterns of the numerals from "0" to "9", and thus the unwanted-dot elimination mask for the numeral is constituted by twenty-four dots as shown in FIG. 4A.

Figure 4B:
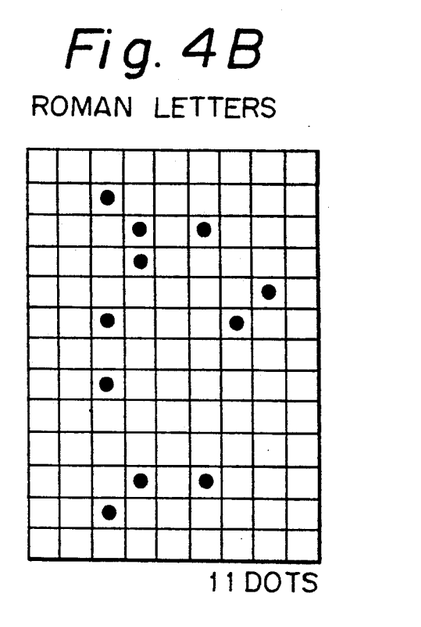
Figure 4C:
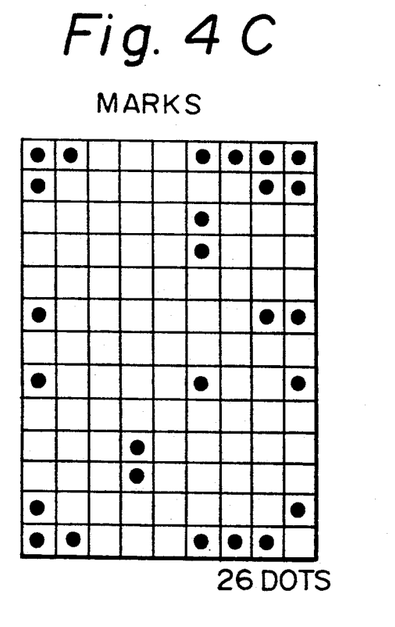

Similarly, FIG. 4B indicates an unwanted-dot elimination mask for roman letters constituted by dots which are not included in any character patterns of the roman letters from "A" to "Z", and FIG. 4C indicates an unwanted-dot elimination mask for a mark constituted by dots which are not included in any character patterns of the marks "#", "$", "%", "&", "-", and "/". Note, as shown in FIG. 4D, an unwanted-dot elimination mask, which is constituted by dots not included in any character patterns all of the numerals from "0" to "9", the roman letters from "A" to "Z", and the marks "#", "$", "%", "&", "-" and "/", is constituted by only one dot.

Figure 4D:
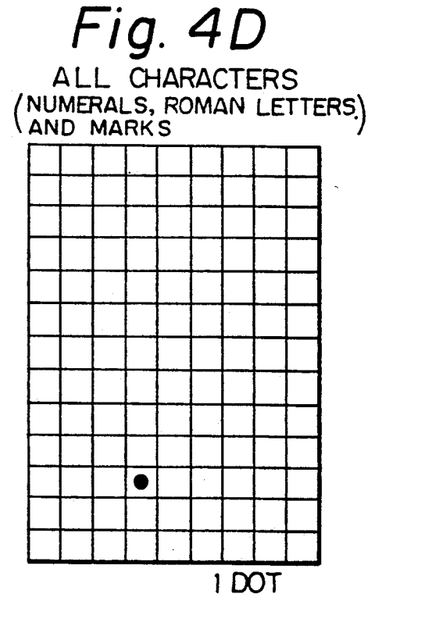

Therefore, when this unwanted-dot elimination mask shown in FIG. 4D is used for eliminating the unwanted-dot from the input image data, the unwanted-dot mask process as described above cannot be sufficiently effective, since only one unwanted-dot is eliminated.

Consequently, the unwanted-dot mask is preferably formed by some limited characters consisting of only numerals, only letters, or some marks as shown in FIGS. 4A to 4C. Note that if the characters comprising numerals, letters and marks, for example, the characters printed on the semiconductor wafer, are positioned at predetermined points, the character recognition process can be carried out more quickly.

Figure 5A:
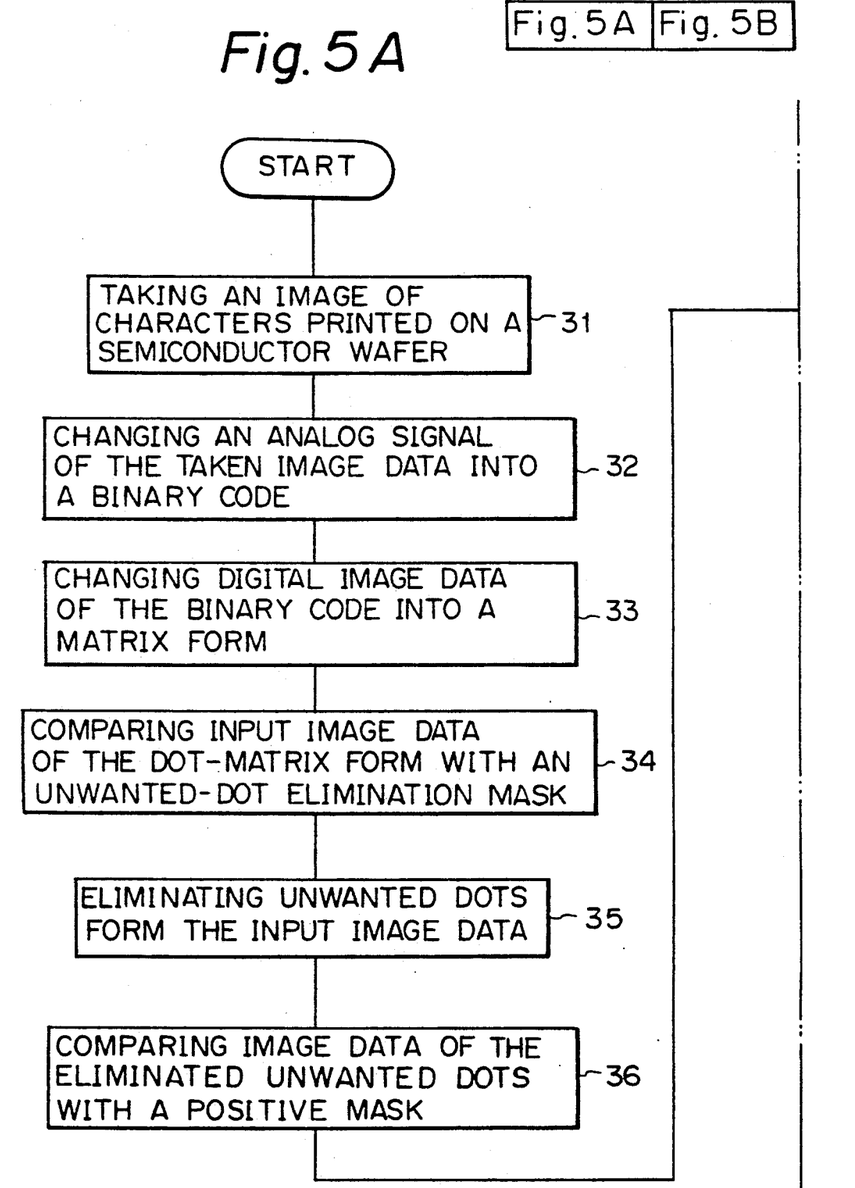
Figure 5B:
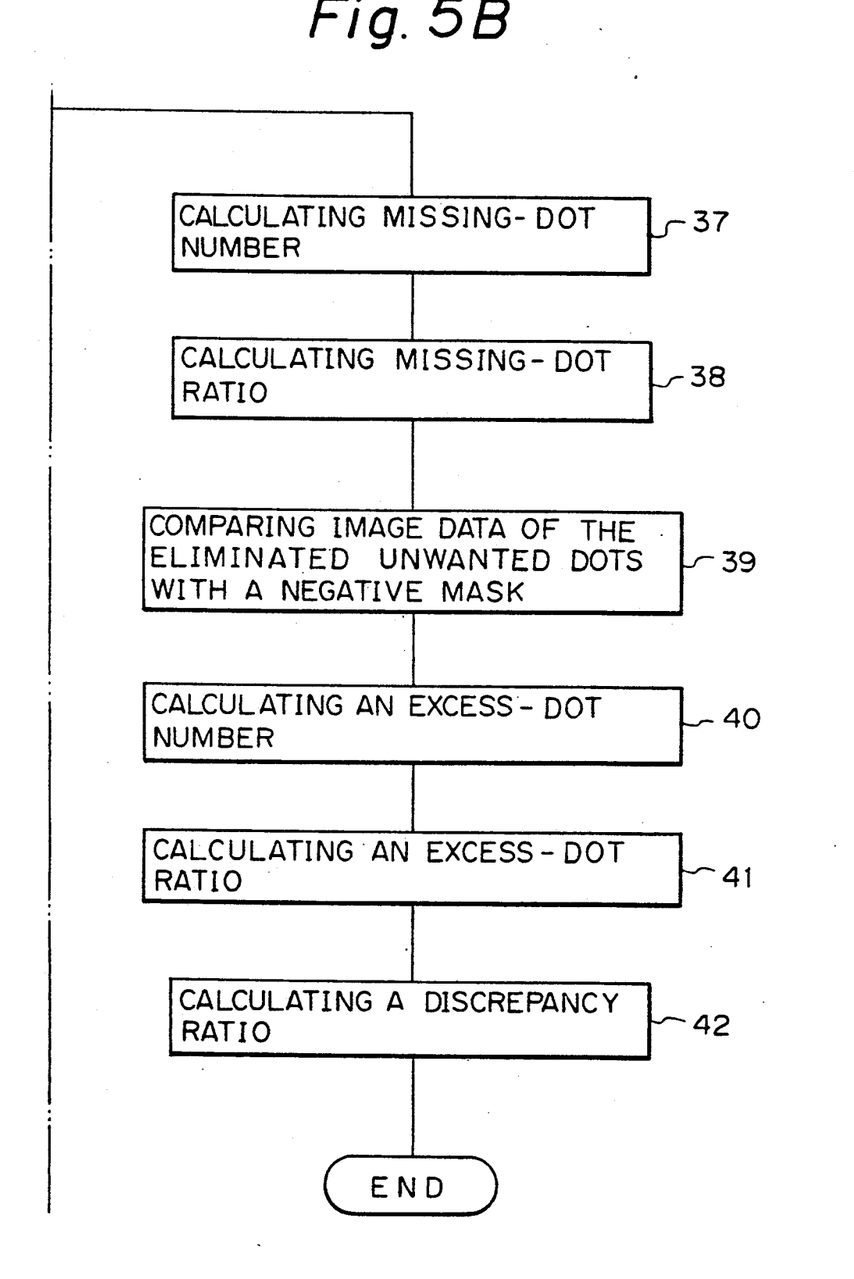

FIGS. 5, 5A, 5B are a flowchart indicating an example of a character recognition process of the character recognition method according to the present invention.

First, when a character recognition process is started, in step 31, for example, characters printed on a semiconductor wafer are taken or read by a camera 21 shown in FIG. 2, and next in step 32, an analog signal of the taken image data is changed into a binary code or a digital image data by a binary processing circuit 22. In step 33, the digital image data of the binary code is changed into a matrix form, for example, a 9×13 dot-matrix.

Next, in step 34, input image data in a dot-matrix form is compared with an unwanted-dot elimination mask as shown in FIGS. 4A to 4C, and next, in step 35, unwanted dots which are not included in any character patterns in the dictionary are eliminated from the input data.

Note, in step 36, image data of the eliminated unwanted dots is compared with a positive mask, in step 37, a missing-dot number is calculated, and then, in step 38, a missing-dot ratio is calculated. Similarly, in step 39, the image data of the eliminated unwanted dots is compared with a negative mask, in step 40, an excess-dot number is calculated, and then, in step 41, an excess-dot ratio is calculated. In step 42, a discrepancy ratio is calculated.

Next, the character recognition process of the present invention will be explained below in detail.

Figure 6A:
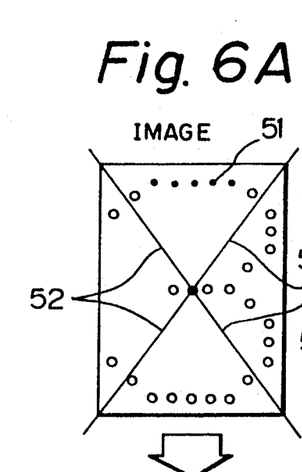
FIGS. 6A to 6G are diagrams explaining the character recognition method according to the present invention.
Figure 6B:
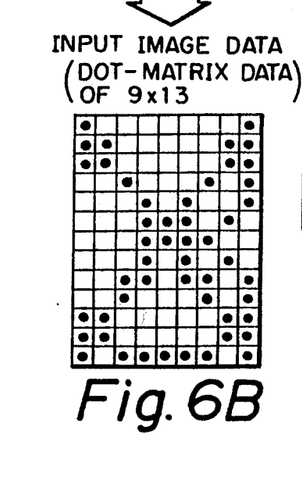

FIGS. 6A to 6G are diagrams explaining the character recognition method according to the present invention. FIG. 6A indicates an example of a character or a numeral "3" which is, for example, printed on a semiconductor wafer, where a flaw 52 comprised of two lines crossing in an X-shape exist on the numeral "3" and five dots 51 of the upper portion of elements in the numeral "3" are missing.

The image shown in FIG. 6A is, for example, taken by a camera 21 (step 31 in FIG. 5A), and an analog signal of the taken image data is changed into a binary code or a digital image data by a binary processing circuit 22 (step 32 in FIG. 5A). Furthermore, the digital image data of the binary code is changed into a matrix form, for example, a 9×13 dot-matrix (step 33 in FIG. 5A).

Figure 6C:
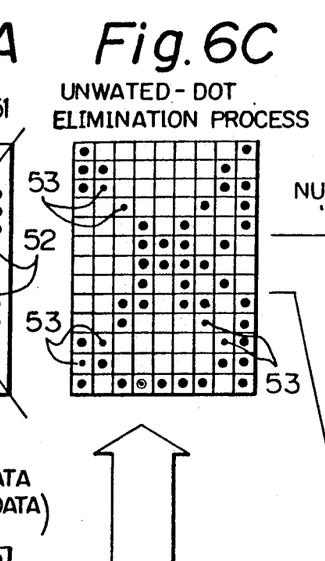

Next, as shown in FIG. 6C, the unwanted-dot elimination process using the unwanted-dot elimination mask described above is carried out. Namely, input image data in the dot-matrix form is compared with an unwanted-dot elimination mask constituted by dots which are not included in any character patterns of the numerals from "0" to "9" as shown in FIG. 4A (step 34 in FIG. 5A), and six unwanted dots 53 are eliminated from the input image data (step 35 in FIG. 5A). Note, the unwanted dots 53 are included in both the input image data and the unwanted-dot elimination mask, or not included in any of the character patterns in the dictionary 25.

Next, a missing-dot ratio calculation process of comparing the image data with each positive mask of each of the numerals from "0" to "9", and an excess-dot ratio calculation process of comparing the image data with each negative mask of each of the numerals from "0" to "9", are carried out. The missing-dot ratio and excess-dot ratio calculation processes using the positive and negative masks of a numeral "3" are indicated in FIGS. 6D and 6E, and the missing-dot ratio and excess-dot ratio calculation processes using the positive and negative masks of a numeral "8" are indicated in FIGS. 6F and 6G.

Figure 8A:
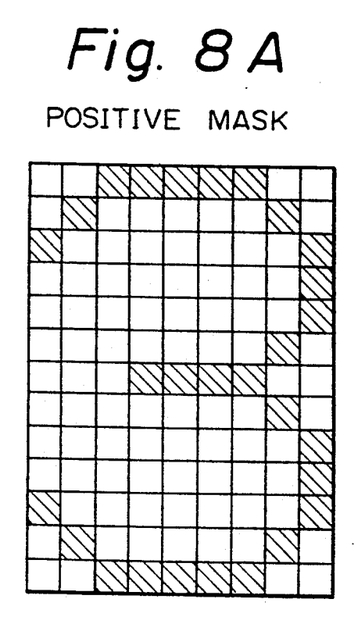
FIGS. 8A and 8B are diagrams indicating examples of a positive mask and a negative mask of a numeral "3".
Figure 8B:
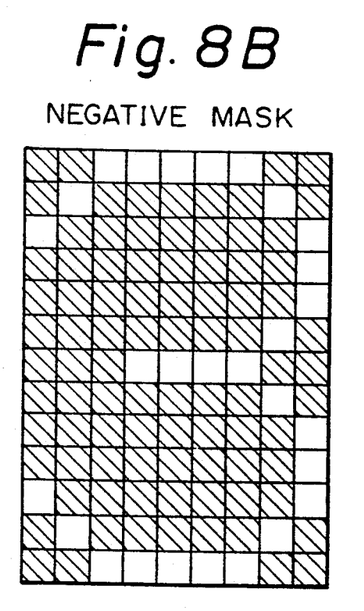

FIGS. 8A and 8B are diagrams indicating respective examples of a positive mask and a negative mask of a numeral "3". First, a positive mask process as shown in FIG. 6D is carried out by using the positive mask shown in FIG. 8A. Namely, the image data with the unwanted dots eliminated is compared with the positive mask of a numeral "3" (step 36 in FIG. 5A), and the number of missing dots (indicated by marks "X" in FIG. 6D) in the image data in relation to the existing positions in the positive mask of "3", is calculated (step 37 in FIG. 5B). Note, this missing-dot number correspond to the number of dots which are included in the positive mask of "3" and are not included in the image data after the unwanted-dot elimination process, and thus the missing-dot number indicates the number of missing portions in the image data. Next, a missing-dot ratio is calculated by using a formula "missing-dot ratio=a missing-dot number/all dot number" (step 38 in FIG. 5B).

Figure 6D:
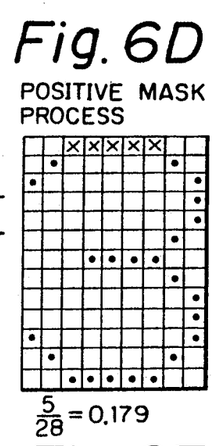

Concretely, when the image data is compared with the positive mask of "3", as shown in FIG. 6D, the missing-dot number is five, and the number of all the dots in the numeral "3" is twenty-eight, and thus the ratio of missing dots to the number of dots in the numeral "3"=5/28≈0.179. Similarly, when the image data is compared with the positive mask of "8", as shown in FIG. 6F, the missing-dot number is twelve and the number of all the dots in the numeral "8" is thirty-five, and thus the ratio of missing dots to the number of dots in the numeral "8"=12/35≈0.343. Note, the missing-dot ratios are not calculated for only the numerals "3" and "8", but are also calculated for all numerals from "0" to "9".

Figure 6E:
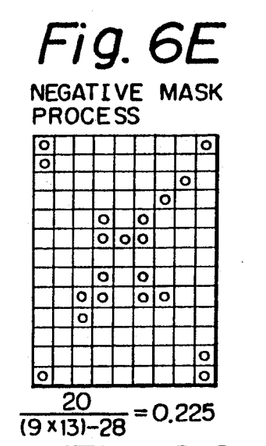
Figure 6F:
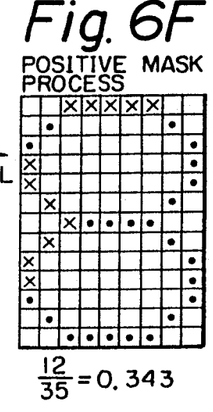
Figure 6G:
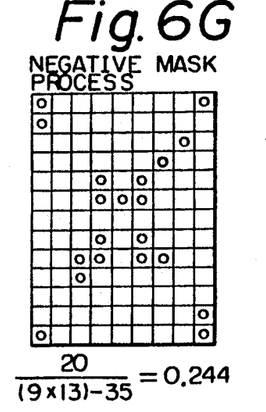

Next, a negative mask process as shown in FIG. 6E is carried out by using the negative mask shown in FIG. 8B. Namely, the image data with the unwanted dots eliminated is compared with the negative mask of "3" (step 39 in FIG. 5B), and the ratio of the number of excess dots (indicated by marks "○" in FIG. 6E) in the image data to the existing positions in the negative mask of "3" is calculated (step 40 in FIG. 5B). Note, this excess-dot number correspond to a number of existing dots which are included in both the negative mask of "3" and the image data after the unwanted-dot elimination process, and the excess dots which may be caused by a flaw or dust, is indicated. Next, an excess-dot ratio is calculated by using a formula "excess-dot ratio=excess-dot number/[(9×13)−all dot number]" (step 41 in FIG. 5B).

Concretely, when the image data is compared with the negative mask of "3", as shown in FIG. 6E, the excess-dot number is twenty, and the number of all the dots in the numeral "3" is twenty-eight, and thus the excess-dot ratio to the numeral "3"=20/(117−28)≈0.225. Similarly, when the image data is compared with the negative mask of "8", as shown in FIG. 6G, the excess-dot number is twenty, and the number of all the dots in the numeral "8" is thirty-five, and thus the excess-dot ratio to the numeral "8"=20/(117−35)≈0.224. Note, similar to the missing-dot ratios, the excess-dot ratios are not calculated for only the numerals "3" and "8", but are also calculated for all numerals from "0" to "9".

Furthermore, a discrepancy ratio to the numeral "3" is calculated by using a formula "discrepancy ratio=missing-dot ratio+excess-dot ratio" (step 42 in FIG. 5B). Concretely, a discrepancy ratio to the numeral "3"=0.179+0.225≈0.404. Similarly, a discrepancy ratio to the numeral "8"=0.343+0.244≈0.587.

Figure 7:
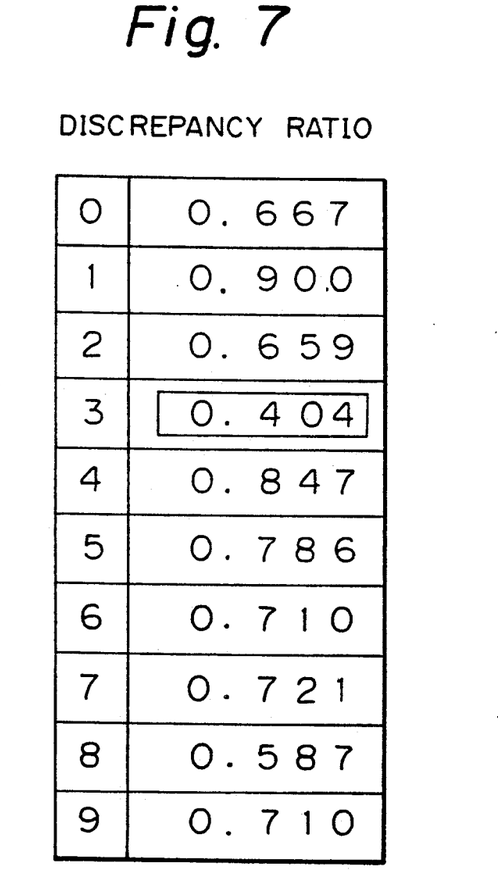
FIG. 7 is a diagram indicating an example of each discrepancy ratio of an image shown in FIG. 6A to all numerals from "0" to "9"

In the above description, all discrepancy ratios to each of the numerals from "0" to "9" are calculated by comparing the image data, which is previously processed by the unwanted-dot elimination mask, with the positive mask and negative mask of each of the numerals from "0" to "9", and a numeral having the minimum value discrepancy ratio is recognized as the character (numeral) indicated by the image data. Concretely, as shown in FIG. 7, in characters of the numerals from "0" to "9", the minimum value discrepancy ratio is that of the numeral "3", namely, the discrepancy ratio of the numeral "3" is 0.404, and thus the numeral "3" is recognized as the character indicated by the image data. Note, in practical character recognition, first, a threshold value (which is, for example, determined at 0.5) of a discrepancy ratio is previously determined, and when a calculated value of a discrepancy ratio is larger than the threshold value even though the calculated value of the discrepancy ratio is at a minimum, character recognition is determined to be impossible, that is, only in the case of a calculated value of a discrepancy ratio being larger than the threshold value is recognition possible.

As described above, in a character recognition method according to the present invention, input image data is compared with character patterns of a predetermined dictionary and a character indicated by the input image data is recognized without requiring any special hardware. Namely, the input image data is processed by using an unwanted-dot elimination mask and processed by using a positive mask and negative mask of each of the character patterns in the dictionary, and then a discrepancy ratio of each of the character patterns is calculated. Consequently, a highly accurate character recognition can be carried at a low cost without using special hardware by decreasing the negative influence of a flaw, a missing portion, dust, and the like.

Many widely differing embodiments of the present invention may be constructed without departing from the spirit and scope of the present invention, and it should be understood that the present invention is not limited to the specific embodiments described in this specification, except as defined in the appended claims.

We claim:

1. A character recognition method of comparing input image data with character patterns of a predetermined dictionary and recognizing a character indicated by said input image data, wherein said character recognition method comprises the steps of:

comparing said input image data with an unwanted-dot elimination mask constituted by unwanted dots not included in any character patterns in said dictionary, and eliminating said unwanted dots from said input image data;

comparing image data having unwanted dots eliminated by said unwanted-dot elimination with each positive mask indicating positive portions of each of said character patterns in said dictionary and calculating a missing-dot ratio of said image data to each of said positive masks of said character patterns;

comparing said image data having unwanted dots eliminated by said unwanted-dot elimination with each negative mask indicating negative portions of each of said character patterns in a dictionary, and calculating an excess-dot ratio of said image data to each of said negative masks of said character patterns; and calculating a discrepancy ratio of said image data to each of said character patterns in said dictionary by using said calculated missing-dot ratio and excess-dot ratio.

2. A character recognition method as claimed in claim 1, wherein said input image data is produced by taking an image of characters by a camera, changing an analog signal of the taken image data into a binary code by a binary processing circuit, and changing the digital image data of the binary code into a dot-matrix form by a dot-matrix processing circuit.

3. A character recognition method as claimed in claim 2, wherein said unwanted-dot elimination mask, said positive masks and negative masks of said character patterns are in the same dot-matrix form as said input image data.

4. A character recognition method as claimed in claim 3, wherein said input image data, said unwanted-dot elimination mask, said positive masks and said negative masks of said character patterns are in a 9×13 dot-matrix form.

5. A character recognition method as claimed in claim 1, wherein said unwanted-dot elimination mask is in a dot-matrix form including character patterns of all numerals from "0" to "9", and said positive and negative masks are in a dot-matrix form of each of the numerals from "0" to "9".

6. A character recognition method as claimed in claim 1, wherein said unwanted-dot elimination mask is in a dot-matrix form including character patterns of all roman letters from "A" to "Z", and said positive and negative masks are constituted by a dot-matrix form of each of the roman letters from "A" to "Z".

7. A character recognition method as claimed in claim 1, wherein said unwanted-dot elimination mask is in a dot-matrix form including character patterns of six marks "#", "$", "%", "&", "-" and "/", and said positive and negative masks are in a dot-matrix form of each of the marks "#", "$", "%", "&", "-" and "/".

8. A character recognition method as claimed in claim 1, wherein said missing-dot ratio to a specific character pattern in said dictionary is calculated by a formula "missing-dot ratio=missing-dot number/all dot number of the specific character pattern".

9. A character recognition method as claimed in claim 1, wherein said excess-dot ratio to a specific character pattern in said dictionary is calculated by a formula "excess-dot ratio=excess-dot number/(all dot number of said dot-matrix form−all dot number of the specific character pattern)".

10. A character recognition method as claimed in claim 1, wherein said discrepancy ratio of said image data to each of said character patterns in said dictionary is calculated by a formula "discrepancy ratio=missing-dot ratio+excess-dot ratio", and a character pattern having the minimum value of said discrepancy ratio is recognized as a character indicated by said input image data.

11. A character recognition method as claimed in claim 1, wherein said character recognition method is used for recognizing a character printed on a semiconductor wafer.

12. A character recognition apparatus for comparing input image data with character patterns of a predetermined dictionary and recognizing a character indicated by said input image data, wherein said character recognition apparatus comprises:

an unwanted-dot elimination means for comparing said input image data with an unwanted-dot elimination mask constituted by unwanted dots not included in any character patterns in said dictionary, and for eliminating said unwanted dots from said input image data;

a missing-dot ratio calculation means for comparing image data having unwanted dots eliminated by said unwanted-dot elimination means with each positive mask indicating positive portions of each of said character patterns in said dictionary, and for calculating a missing-dot ratio of said image data to each of said positive masks of said character patterns;

an excess-dot ratio calculation means for comparing said image data having unwanted dots eliminated by said unwanted-dot elimination means with each negative mask indicating negative portions of each of said character patterns in said dictionary, and for calculating an excess-dot ratio of said image data to each of said negative masks of said character patterns; and a discrepancy ratio calculation means for calculating a discrepancy ratio of said image data to each of said character patterns in said dictionary by using said calculated missing-dot ratio and excess-dot ratio.

13. A character recognition apparatus as claimed in claim 12, wherein said character recognition apparatus further comprises:

a camera for taking an image of characters;
a binary processing circuit, connected to said camera, for changing an analog signal of the taken image data into a binary code; and
a dot-matrix processing circuit, connected to said binary processing circuit, for changing the digital image data of the binary code into a dot-matrix form.

14. A character recognition apparatus as claimed in claim 13, wherein said unwanted-dot elimination mask, said positive masks and negative masks of said character patterns are in the same dot-matrix form as said input image data.

15. A character recognition apparatus as claimed in claim 14, wherein said input image data, said unwanted-dot elimination mask, said positive masks and said negative masks of said character patterns are in a $9 \times 13$ dot-matrix form.

16. A character recognition apparatus as claimed in claim 12, wherein said unwanted-dot elimination mask is in a dot-matrix form including character patterns of all numerals from "0" to "9", and said positive and negative masks are in a dot-matrix form of each of the numerals from "0" to "9".

17. A character recognition apparatus as claimed in claim 12, wherein said unwanted-dot elimination mask is in a dot-matrix form including character patterns of all roman letters from "A" to "Z", and said positive and negative masks are constituted by a dot-matrix form of each of the roman letters from "A" to "Z".

18. A character recognition apparatus as claimed in claim 12, wherein said unwanted-dot elimination mask is in a dot-matrix form including character patterns of six marks "#", "$", "%", "&", "-" and "/", and said positive and negative masks are in a dot-matrix form of each of the marks "#", "$", "%", "&", "-" and "/".

19. A character recognition apparatus as claimed in claim 12, wherein said missing-dot ratio to a specific character pattern in said dictionary is calculated by a formula "missing-dot ratio=missing-dot number/all dot number of the specific character pattern".

20. A character recognition apparatus as claimed in claim 12, wherein said excess-dot ratio to a specific character pattern in said dictionary is calculated by a formula "excess-dot ratio=excess-dot number/(all dot number of said dot-matrix form—all dot number of the specific character pattern)".

21. A character recognition apparatus as claimed in claim 12, wherein said discrepancy ratio of said image data to each of said character patterns in said dictionary is calculated by a formula "discrepancy ratio=missing-dot ratio+excess-dot ratio", and a character pattern having the minimum value of said discrepancy ratio is recognized as a character indicated by said input image data.

22. A character recognition apparatus as claimed in claim 12, wherein said character recognition apparatus is used for recognizing a character printed on a semiconductor wafer.

* * * * *